United States Patent
Chu et al.

(10) Patent No.: US 8,976,730 B2
(45) Date of Patent: Mar. 10, 2015

(54) ENHANCED CAPABILITIES AND EFFICIENT BANDWIDTH UTILIZATION FOR ISSI-BASED PUSH-TO-TALK OVER LTE

(75) Inventors: Thomas P. Chu, Englishtown, NJ (US); Tewfik Doumi, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 112 days.

(21) Appl. No.: 13/188,555

(22) Filed: Jul. 22, 2011

(65) Prior Publication Data

US 2013/0021965 A1 Jan. 24, 2013

(51) Int. Cl.
*H04L 29/06* (2006.01)
*H04W 4/02* (2009.01)
*H04W 76/00* (2009.01)
*H04W 4/10* (2009.01)
*H04W 28/06* (2009.01)
*H04W 72/04* (2009.01)

(52) U.S. Cl.
CPC ............. *H04L 65/4061* (2013.01); *H04W 4/10* (2013.01); *H04W 28/065* (2013.01); *H04W 72/04* (2013.01)
USPC ............................. 370/328; 370/470; 370/493

(58) Field of Classification Search
USPC ............ 370/260, 352–356, 470, 535; 455/73, 455/90.2, 436
See application file for complete search history.

(56) References Cited

U.S. PATENT DOCUMENTS

| | | | | |
|---|---|---|---|---|
| 6,014,375 | A * | 1/2000 | Janky | 370/347 |
| 7,031,309 | B1 * | 4/2006 | Sautter et al. | 370/392 |
| 2003/0179712 | A1 * | 9/2003 | Kobayashi et al. | 370/249 |
| 2006/0041815 | A1 * | 2/2006 | Haymond | 714/748 |
| 2007/0242670 | A1 * | 10/2007 | Simonson et al. | 370/390 |
| 2008/0031275 | A1 * | 2/2008 | Janky et al. | 370/466 |
| 2008/0043744 | A1 * | 2/2008 | Keller et al. | 370/395.2 |
| 2008/0049711 | A1 * | 2/2008 | Desai et al. | 370/347 |
| 2008/0102869 | A1 * | 5/2008 | Shaffer et al. | 455/518 |
| 2008/0200162 | A1 * | 8/2008 | Chowdhury et al. | 455/422.1 |
| 2008/0220765 | A1 * | 9/2008 | Chu et al. | 455/422.1 |
| 2009/0005100 | A1 * | 1/2009 | Copeland | 455/518 |
| 2010/0261477 | A1 * | 10/2010 | Duran et al. | 455/445 |
| 2010/0330973 | A1 * | 12/2010 | Miller et al. | 455/418 |
| 2011/0065415 | A1 * | 3/2011 | Miller et al. | 455/404.1 |

OTHER PUBLICATIONS

"Project 25, Inter-RF Subsystem Interface, Message and Procedures for Voice Services", TIA-102.BACA-A, Jan. 2009, pp. 166-187.
Rosenberg, J., et al., "SIP: Session Initiation Protocol", RFC 3261, IETF, Jun. 2002.

(Continued)

*Primary Examiner* — Andrew Chriss
*Assistant Examiner* — John Lequang
(74) *Attorney, Agent, or Firm* — Fay Sharpe LLP

(57) ABSTRACT

For voice traffic over-the-air in LTE, persistent schedule (PS) or semi-persistent (SPS) scheduling would be the preferred method as they minimize signaling messages. In PS or SPS, resources are pre-allocated to the UE 402 at regular intervals (e.g., every 20 milliseconds). At each time slot, the UE will generally transmit an IMBE frames which are encoded in ISSI packet. In ISSI, other data streams are multiplexed with the IMBE frame and thus the packet size varies depending on its position within a super-frame. For PS or SPS, eNodeB must allocated sufficient resources to support the largest packet that. Therefore, there is spare capacity when the packet is not of the largest size. The exemplary embodiments specify ways to use spare capacity to transfer data.

17 Claims, 10 Drawing Sheets

(56) References Cited

OTHER PUBLICATIONS

Schulzrinne, H, et al, "RTP: A Transport Protocol for Real-Time Applications", RFC 3550, Jul. 2003.

"Project 25 FMDA Common Air Interface" TIA/EIA-102.BAAA, Sep. 2003.

\* cited by examiner

ENHANCED CAPABILITIES AND EFFICIENT BANDWIDTH UTILIZATION FOR ISSI-BASED PUSH-TO-TALK OVER LTE

FIELD OF INVENTION

The exemplary embodiments relate generally to wireless communications. More particular, the exemplary embodiments relate to a method and system that provide enhanced capabilities in a bandwidth efficient manner for ISSI-based push-to-talk over LTE.

BACKGROUND

By way of background, wireless networks have been in use in the public safety sector, (police, fire fighters, emergency workers, etc.) for a long time. For example, in the United States, the standard of public safety wireless network is the APCO (Association of Public Safety Communications Officials) Project 25 (P25) Systems, whose specifications are the responsibility of the Telecommunications Industry Association (TIA), standard committee TR-8. The P25 standard is an international standard with systems deployed in over 40 counties.

FIG. 1 shows an embodiment of a high level architecture of a P25 system. The local network may consist of any number of base stations (shown as 110 and 120), referred to as sites in P25 terminology. A plurality of subscriber wireless communication devices (shown as 101-104) are connected to the base stations through the air interface. The base stations are connected to a collection of controlling modules referred to collectively as the radio frequency sub-system (RFSS) 126. In P25, two relevant functional modules are the call control module 122, which handles call signaling, and the media control module 124, which deals with the forwarding and processing of media (e.g., voice) traffic. Attached to the RFSS are peripherals such as a dispatch console 128, one or more databases 130, one or more data terminals 132, and one or more gateways 134 to other networks such as the public switched telephone network (PSTN) 136. An Internet Protocol (IP) network 138 couples the RFSS 126 to other RFSSs.

Group Calls and Push to Talk (PTT)

One of the most important applications for a public safety wireless network is a group PTT call, i.e., a call in which one member of the group can speak to all other members simultaneously. For example, all police officers on patrol could constitute one group. In order to facilitate communications in an orderly manner, a floor control mechanism is needed to arbitrate who should generally speak in the event two and more members request to speak at the same time. As is known, a PTT user who wants to speak to the group will generally push a button on the person's handset. A message would then be sent to the RFSS, which will generally arbitrate all the talk requests and either grant or deny each request by sending a response back to the requestors.

The Inter RF Sub-System Interface

The public safety sector has recognized the need of connecting different RFSSs together to form a larger network with a much larger coverage. Based on this need, the TIA TR8 committee has developed such a standard, referred to as the Intra-RF Sub-Systems Interface (ISSI). This specification is based on IP for the transport of information. The call signaling protocol is based on the Session Invitation Protocol (SIP, RFC 3261), while the voice traffic and push-to-talk control messages are carried through the use of the Real Time Protocol (RTP), RFC 3550). The ISSI specifies the connection between the RFSSs. The over-the-air interface protocol is specified by another suite of standards.

With the ISSI a group can span multiple RFSSs. One RFSS would be designated the home RFSS, which will generally manage all the activities of the group. The floor-arbitrate function of the group also resides at the home RFSS. The non-home RFSSs are referred to as serving RFSS and are connected to the home RFSS through RTP. Members of a group do not need to be attached at the home RFSS; that is, they can roam to another RFSS. When a user of the group requests the floor, then the serving RFSS forwards the request to the home RFSS using the ISSI. The home-RFSS will generally arbitrate any received requests and award the floor to a "winning" user. In addition to floor arbitration, the home RFSS also receives voice traffic from a serving RFSS and forwards it to other RFSSs. Specifically, the ISSI supports the following functions for group calls.

When a user at a serving RFSS indicates that it would like join a group, the serving RFSS registers the user with the home RFSS, indicating that there are one or more users at its location joining the group. The SIP REGISTER message may be used to accomplish this registration process.

Voice traffic and PTT control messages are conveyed using RTP. ISSI specifies procedures to set up RTP connectivity between home RFSS and serving RFSSs. The SIP protocol suite is used to signal the RTP set up. In order to conserve network resources, after an extended period of inactivity, the home RFSS may tear down the RTP connections between it and the serving RFSSs. During this period, the serving RFSSs remain registered with the home RFSS. When the call becomes active again, the home RFSS or the serving RFSS can trigger call set up to re-establish the RTP connectivity again.

ISSI provides a set of control messages to support push-to-talk. These messages are encoded as part of the RTP messages.

Voice traffic is also carried as part of the RTP payload. RTP connectivity is generally established before PTT control messages and voice traffic can be sent between the home RFSS and the serving RFSSs.

PTT Control in ISSI

ISSI supports various Pit control messages, including, but not limited to, the following:

PTT-transmit-request: A message sent from a serving RFSS to the home RFSS requesting the floor on the behalf of a user.

PTT-transmit-grant: A message sent by the home RFSS to a serving RFSS granting a request from that serving RFSS.

PTT-transmit-deny: A message sent by the home RFSS to a serving RFSS denying a request from that serving RFSS.

PTT-transmit-start: A message sent by the home RFSS to all serving RFSS, except the serving RFSS that has been granted the floor, indicating that the floor has been grant to a user at another RFSS. These RFSSs should generally be prepared to receive traffic.

PTT-transmit-wait: A message sent by the home RFSS to a serving RFSS which has just requested the floor. This message indicates that the home RFSS is processing the request, but the processing may take some time such as when enhanced functions are required.

PTT-transmit-mute (and PTT-transmit-unmute): These messages can be sent by all RFSSs to mute (or unmute) a transmission temporary such as because of resource problems.

PTT-heartbeat and PTT-heart_query: These messages ascertain the RTP connectivity between RFSSs.

FIG. 2 is an illustration of a call flow for PTT over ISSI. In FIG. 2, an RFSS 200 represents the home RFSS of a talk group. Connected to the home RFFS 200 are various serving RFSSs 210, 220, and 230. Various users (SU) 212, 222, and 232 are connected to these RFSSs, respectively. In this example, it is assumed that RTP connectivity between the home RFSS and the serving RFSS has already been set up. The sequence of events is described below.

In this example, a first user (SU 212) and a second user (SU 222) both want to speak to the floor. They press a button at the handset at about the same time. By pressing the button, the handset typically generates a Group-voice-request (GRP_V_REQ) message to their respective serving RFSS (210 and 220) over-the-air interface. They are shown as messages 1 and 1'.

The serving RFSS 210, upon receiving the GRP_V_REQ message from the first user (SU 212), typically generates a PPT-transmit-request message to the home RFSS. The PTT message is one of the push-to-talk control messages encoded as an RTP packet, as specified in the ISSI specification. It is assumed that the first user (SU 212) is the only SU to request the floor at the serving RFSS 210. If there is more than one SU at RFSS 210 requesting the floor, the serving RFSS 210 typically determines a local winner, based on the priority of the request as well as the local policy. The PTT-transmit-request message includes the identity of the first user (SU 212), the subscriber requesting the floor. Similar events take place at RFSS 220. The PTT-transmit-request messages are shown as messages 2 and 2'.

The home RFSS, upon receipt of the two PTT-transmit-request messages from the RFSSs 210 and 220, will typically decide who would win the floor. In this example, it is assumed that the first user (SU 212) is the floor winner. Upon deciding that the second user (SU 222) is the floor winner, the home RFSS 200 will generally: (1) Send a PTT-transmit-deny message (message 3) to the serving RFSS 210 informing it that its request for SU 212 has been denied; (2) send a PTT-transmit-grant message (message 4) to RFSS 220 indicating that SU 222 has been awarded the floor; and (3) send to PTT-transmit-start message (message 6) to all RFSSs except the RFSS of the floor winner, i.e., RFSS 220.

Both the PTT-transmit-grant and the PTT-transmit-start messages contain the identity of the floor winner. Both messages, upon arrival at the serving RFSS, will generally cause the generation of Group-voice-grant (GRP_V_GRANT) (messages 7 and 7') over-the-air to all members of the group connecting to the RFSS. Through these messages, other members of the group are informed that the first user (SU 210) is awarded the floor and that each should generally prepare to receive speech from it.

Structure of Over-The-Air Voice Traffic for P25

P25 uses the IMBE vocoder, which encodes one 20 millisecond segments of speech one at a time. The output is then encoded as a voice frame. The IMBE may group 18 of such frames into a super frame, as shown in FIG. 3. The first 9 voice frames of a super frame 302 are collectively referred to as data (or logical) unit 1 (304), while the last 9 frames are collectively referred to as data (or logical) unit 2 (306). When transmitting over-the-air, other types of traffic are typically multiplexed with the voice frames, such as the link control word (LC), low speed data (LD), and encryption sync word (ES).

The link control word (LC) field contains information such as Manufacturer ID, Talk group ID or destination ID, Source ID, and/or Emergency indication.

The low speed data (LD) field allows the sender to send a very small amount of data with the voice traffic if needed. The field is only 4 octets (1 octet=8 bits) long for each super frame (360 milliseconds), result in a bit rate of 88.89 bits per second.

The encryption sync word (ES) field contains information so that the next super frame of voice traffic can be decrypted. The message indicator contains the encryption initialization vector for the next super frame. The algorithm ID specifies the encryption algorithm used. The key ID which specifies the key used in encryption.

In order to operate in a noisy environment, the voice traffic (as well as the LC, LD, and ES fields) is encoded with forward error correction codes (both the Golay code and the Hamming Code) so that some amount of errors in transmission can be corrected.

At the beginning of a talk spurt, the voice traffic is preceded by a header work, which contains information such as the message indicator, the algorithm ID, and the key ID as in the ES word (this information is used by a receiver to decode the first super-frame), the manufacturer ID, and/or the talk group ID.

LTE

The 3rd Generation Partnership Project (3GPP) initiated the Long Term Evolution (LTE) project in 2004 to address its next generation wireless technology and architecture. Initial specifications of LTE appear as release 8 of the 3GPP family of specifications. LTE provides a number of improvements/enhancements to the current 3rd generation systems, such as spectral flexibility (i.e., the technology can operate over 1.4, 2.5, 5, 10, 15 and 20 MHz channels), high spectral efficiency (i.e., the technology has a high bit rate per Hz, which couples with the ability to support high bandwidth result in high data rate, whereby for a 20 MHz channel the downlink is 100 Mbps while the uplink is 50 Mbps), flexible cell size (i.e., cell size can be from 5-100 km, reduced latency, all IP architecture (i.e., the architecture is IP based which enables easy deployment of services such as video, voice, web access, etc. and also allows simpler inter-working with other fixed and mobile networks), open interface for inter-working (i.e., provides open interfaces to inter-work with existing technologies, and QoS support.

LTE System Architecture

An exemplary LTE architecture is illustrated in FIG. 4. The major components of the systems include, but are not limited to, at least one user equipment (UE) 402, at least one evolved node B (eNodeB) 404, at least one Mobility Management Entity (MME) 406, at least one serving gateway (S-GW) 408, at least one PDW Gateway (P-GW) 410, at least one Policy and Charging Rule function (PCRF) 412, and at least one Home Subscriber Server (HSS) 414.

The evolved node B (eNodeB) 404 is the base station in LTE.

The Mobility Management Entity (MME) 406 handles the authentication of the UE 402 when it first attached to the LTE network. It also handles the signaling for bearer setup, modification, and tear-down. It also manages roaming of the UE 402.

The serving gateway (S-GW) 408 acts as mobility anchor for inter-eNodeB handover. Multiple eNodeBs 404 can be connected to an S-GW 408. As the UE 402 roams from each eNobeB 404 that is attached to the same S-GW, packets from/to the UE 402 will generally go through the same S-GW (thus the term anchor point). LTE specifies the interface between eNodeBs 404 (the X2 interface) to support smooth hand-off. As a reference, the S-GW 408 typically can support an area the size of 2-3 states.

The PDW Gateway (P-GW) 410 provides interfaces to other IP networks and serves as the global mobility anchor for the UE. Multiple S-GWs can be connected to the P-GW 410. In border areas, it is possible that the UE 402 roams from one S-GW to another S-GW. In this scenario, all packets will generally still go through the P-GW 420 (and thus the term global anchor point).

The Policy and Charging Rule Function (PCRF) 412 supports per session QoS and associated billing. The PCRF 412 will generally accept requests from external servers to setup bearers with the appropriate QoS supports in the LTE network. When the UE 402 requests a bearer setup, the P-GW 410 will generally forward the request to the PCRF 412 for approval.

The Home Subscriber Server (HSS) 414 maintains the user profiles. If the network operator also deploys an IP Multimedia Subsystem (IMS) 416, the HSS 414 can be shared between the LTE network and the IMS 416.

Note that the standard also specifies connections between multiple eNodeBs, MMEs, and S-GWs connecting among themselves (not shown in FIG. 1).

LTE Bearer

In LTE, the UE 402 will generally send and receive user packets through its designated PDN-GW. The data path between the UE and the PDN-GW 410 will generally go through the eNodeB 404 and the S-GW 408. (The data path is shown as solid lines in FIG. 3; the dotted lines are paths for signaling messages.) The PDN-GW 410 will then forward the data packet to its intended destination. It also accepts packets on the behalf of the UE 402, and then forwards the arriving packets to the UE 402.

The logical connection between the UE 402 and the PDN-GW 410 is referred to as the EPS (Evolved Packet System) "bearer" (or bearer for short). Associated with each bearer is a QoS (Quality of Service) profile which governs how packets of this bearer should generally be treated by the network. As the UE 402 may have multiple concurrent sessions, each with a different QoS needs, multiple bearers can be set up between an UE 402 and the PDN-GW 410, each supporting a different grade of QoS. Multiple sessions of the same QoS class can be mapped onto the same bearer.

When an UE 402 is first attached to the network, a default bearer, with a prescribed QoS, will generally be set up between the UE 402 and the PDN-GW 410. Other bearers, often referred to as dedicated bearers, can be set up and torn down on an as needed basis.

Resource Allocation and Scheduling

Residing in the eNodeB 404 is a scheduler, which manages the resource allocation for both upstream and downstream traffic. In the downstream direction, the eNodeB 404 receives data packets from the S-GW 408. Based on the quality class indicator (QCI), guaranteed bit rate (GBR), and maximum bit rate (MBR) of the bearers, and/or the bandwidth of the air link, the scheduler may determine when a packet will be forwarded downlink to the UE 402. For example, for a guaranteed bit rate (GBR) bearer, the eNodeB 404 should generally reserve sufficient resources so that, if the traffic load of the incoming packets for the bearer is less than or equal to its GBR, the packet would be forwarded with little delay. For non-GBR bearers, it is possible congestion could occur and the packets will generally be buffered at the eNodeB incurring some delay. In extreme cases packets may be discarded.

Data is transmitted in frames in LTE. A frame contains a number of resource blocks which are the basic information units. Embedded in the downlink channel are the Physical Downlink Control Channels (PDCCH). A PDCCH carries the DCI (Downlink Control Information), which includes the resource assignments for the UE 402 or group of UE. By monitoring the PDCCH, the UE 402 could determine whether a particular downlink frame contains information for it or not.

In uplink, when the UE 402 has data to send, it will generally first send either a Scheduling Request (SR) or Buffer Status Reports (BSR) to the eNodeB 404. The SR is sent using the Physical Uplink Control Channel (PUCCH), while the BSRs are sent using resource blocks that are assigned to the UE for uplink transmissions. If needed, the UE 402 can use the random access procedure to request an allocation to send a BSR. One or more BSR messages can be piggybacked with user data packets if they fit. Based on the QCI, GBR, MBR of the bearer and the amount of data buffered at the UE's transmitter, the eNodeB 404 typically determines when the UE 402 should generally transmit (and how much). This decision is conveyed as a DCI message over the PDCCH channel as described previous. The above process is often referred to as dynamic scheduling (DS), since the UE 402 is requesting resource allocation at an on-demand basis.

For many GBR applications, such as voice over IP (VoIP), data is transmitted at regular intervals (e.g., one voice packet every 20 milliseconds for most VoIP applications). If dynamic scheduling is used, every 20 milliseconds for the uplink, there will generally be an upstream service request, followed by a grant, and then the transmission of the user data. For the down link, there will generally be a downlink DCI message every 20 milliseconds, indicating the downlink resource allocation. This is inefficient as there are many signaling messages (2 per 20 milliseconds). Therefore, LTE supports another type of scheduling, persistent scheduling (PS), to support these applications. In PS, when the eNodeB allocates to UE the initial resource block for both uplink or downlink transmission, it also implicitly allocates subsequent resource blocks, at regular intervals as indicated by the application. This avoids all subsequent signaling messages between the UE 402 and the eNodeB 404 for this bearer.

Silence Suppression and Semi-Persistent Scheduling

LTE supports voice calls, among other things. In a conversational voice call between two individuals, usually only one person will generally speak at a time. The other person will generally just be listening. Therefore, to be bandwidth efficient, most voice codecs, such as the Adaptive Multi-rate (AMR) coder from 3GPP, support silence detection. The codec has the capability to detect silence period when a person is not speaking (and even during silence periods within a talk spurt). When the codec detects a silence period, the codec will generally not generate voice packets thus saving bandwidth. During the silence period, the codec may send silence insertion descriptors (SID) every so often, but at a much slow rate than regular voice packets. The SID packets describe the nature of the background voice (such as noise level) so that the receiver can reproduce the background environment more accurately. For AMR, regular voice packet is sent once every 20 ms, while SID packets are sent once 160 milliseconds. For conversation voice, the silence period of a typical call is about 58% on the average (i.e. an activity period of about 42%). Therefore, there is substantial saving in bandwidth if silence suppression is used, and consequently, more calls can be admitted.

When silence suppression is enabled in a codec, persistent scheduling would not be every efficient. Consider the AMR codec as an example. During a silence period, SIDs are transmitted once every 160 milliseconds. However, with PS, resource slots are allocated every 20 milliseconds for the transmission of regular voice packets. Therefore, 7 out of 8 resource blocks are wasted during the silence period. Because of this, LTE also supports another form of scheduling, i.e., semi-persistent scheduling (SPS). In SPS, when the user at the UE 402 wants to speak, the UE 402 will generally send an SR to the eNodeB 404. The eNodeB 404 will then grant the UE's initial request just as in the case for PS. In the example for AMR, a transmission slot is granted implicitly every 20 milliseconds. When the UE 402 enters a silence period, it will generally stop transmitting voice packets to the eNodeB 404. When the eNodeB 404 detects that there are a number of consecutive empty slots (e.g., 2 or 3 slots), it will generally assume that the UE 402 has entered a silence period. The eNodeB 404 can then release the subsequent implicitly assigned slots and allocate them to other users if needed. When the UE 402 needs to send a SID, it will generally send a service request (SR) to the eNodeB 404 using dynamic scheduling (DS). The UE 402 would only request sufficient resources to transmit the SID packet. When the UE 402 wants to transmit the next SID packet (160 milliseconds later for AMR) it will generally send another SR to eNodeB 404 again using DS. When the user at the UE 402 speaks again, the UE 402 will generally then send an SR to the eNode 404 starting SPS.

Public Safety Sector and LTE

Public safety agencies realize the important of deploying multimedia applications, such as streaming video. The current public safety wireless networks, such as the P25 systems as described above, are narrow band systems and lack the speed to support these applications (e.g., each channel in P25 operates at 9.6 Kbps). Therefore, public safety agencies are interested in deploying broadband wireless networks to support these new applications. LTE represents a technology that may be used. Deployment of mission critical PTT services over these broadband networks will generally be a natural development.

ISSI Over P25

When considering deploying PTT services over LTE, a concern is the interoperability between the PTT services over the LTE network and the PIT services of the P25 network. For example, one would like the ability of a talk group spans over both networks. One approach is to use ISSI as the basis for the PTT protocol for the LTE network.

One approach is illustrated in FIG. 5. The system shown in the figure includes a PTT server (identified as ISSI/LTE GW 500 in FIG. 5), one or more UE 502, at least one eNodeB 504, at least one SGW 506, at least one MME 508, at least one HSS 510, at least one PGW 512, at least one PCRF 514, one or more P25 base stations 516, at least one dispatch console 518, at least one console subsystem 520, and at least one RFSS 522.

In this approach, PTT is supported through the PTT server 500. By way of example, suppose the UE 502 wants to invoke the PTT services. It would first establish an EPS bearer to the P-GW 512. This bearer would support the SIP signaling between the UE 502 and the server 500 using the procedures as specified in the ISSI for both authentication and call set up. When joining a talk group, the UE 502 (or the server 500) would set up an RTP connection to convey voice packets between the two. The RTP connection will generally operate over another EPS bearer, which is set as a result of the SIP signaling. Although the protocol is the same as specified in the ISSI specification in most respects, there is at least one difference. In the formal specification, the ISSI protocol is between two RFSSs. In this usage, the protocol is between a RFSS-like server and the user equipment. Thus, the behavior of the server would be slightly different. For example, when the server receives voice packets from the UE, it will generally forward the packets to all other UEs belonging to the same talk group that is attached to it, in addition to other servers. In that case, the protocol between the server and the UEs may be referred to as ISSI-UE.

The server 500 can be connected to other P25 RFSSs 522 using the ISSI. In FIG. 5, it is shown as being connected to RFSS 522. Although, in FIG. 5, only one P25 RFSS 522 is shown connected to the server 500, multiple RFSSs can be connected to the server 500. From the view point of the P25 RFSS 522, the server 500 behaves exactly like another RFSS.

There are a number of approaches to support PTT over an IP-based wireless network. However, they all are consumer oriented. The advantages listed below are the advantages of ISSI/LTE when compared to these other approaches for public safety. For instance, talk groups can be homed at either the LTE network or the P25 network and user devices with dual radios (LTE and P25) can roam from one network to another. The system can leverage all the support systems that are already in existing in the P25 network. For example, the console sub-system in the P25 can be used to support UE that are attached to the LTE network. Also, the key management system in the P25 network can be used to manage the group key for UEs that are attached to the LTE network. Interoperability for PTT between the two networks would be simpler as the protocol over the LTE network is ISSI based.

In dynamic scheduling the UE (User Equipment) will generate a service request when it has a packet to transmit. For voice, a packet is transmitted every 20 milliseconds. Thus, the UE will generally request a transmission every 20 milliseconds. This is inefficient in terms of the usage of the MAC layer signaling channel. One way to reduce the signaling request is to use persistent signaling (PS) and/or semi-persistent (SPS) signaling. In PS and SPS, a fixed amount of resource is allocated at every 20 milliseconds (or other periodic intervals). With this pre-allocation, the UE does not need to send a service request every 20 milliseconds and thus the number of signaling messages are greatly reduced.

In a system that uses ISSI over LTE it is likely that there will generally be unused bandwidth when transmitting voice packets, if PS or SPS is used. This inefficiency arises for a number of reasons.

The ISSI voice packets are of unequal length as some of them carry other information in addition to voice. Given that the resource allocated is fixed but the packet is of variable size, with PS or SPS, the allocation must support the maximum packet size. Therefore, there is spare bandwidth for some packets.

Thus, there is a need for a method and system that utilizes this spare capacity to transfer data.

SUMMARY

Described herein are methods for using spare capacity to transfer data in LTE systems. One method applies when the spare capacity is small (e.g., 4 octets) for each applicable packet. In this case, the enhanced data may be appended to the IMBE (Improved Multi-Band Excitation) frame within a basic IBME block. This scenario arises when the ISSI packet and the first IMBE frame are transmitted as separate ISSI packets. Another method applies when the spare capacity is reasonably high (e.g., 14-18 octets) for each applicable packet. In this case, the enhanced data may be sent as a manufacturer-specific block. This method arises when the ISSI header is sent together with the first IMBE voice block. With the introduction of this new block type from the second method, it is possible for an UE to send an ISSI packet to the ISSI/LTE server without accompanied IMBE blocks. In particular, if a talk group supports losing audio, these packets can be sent as "losing" audio packets (i.e., the UE does not need to win the floor to send). For prolonged sessions, it is possible for the UE to set up a separate, dedicated EPS bearer to the ISSI/LTE server or other interested parties.

Some examples of applications that can use the exemplary embodiments include geographic location reporting (longitude, latitude, and height), network location (cell ID and tracking area), and sensor data.

In one embodiment, a computer-implemented method of transmitting supplemental information in IMBE blocks is provided. The method includes identifying an IMBE voice block requiring fewer than a full allocation of octets and therefore having unused octets, revising a frame type identifier associated with the identified block to identify the block as an enhanced IMBE block, selecting some of the unused octets to act as a control field, assigning values to some of the control field to identify a parameter type, and assigning values to some of the control field to indicate that appended data is one of: the first data segment of the parameter, the last data segment of the parameter, or an intermediate data segment of the parameter. The method also includes assigning values to other octets of the unused octets according to the parameter value and metadata describing aspects of the parameter value, thereby completing the assembly of an enhanced IMBE block, and then transmitting the enhanced IMBE block.

In another embodiment, a computer-implemented method of enhancing voice packets using an ISSI-based protocol in a transport network is provided. This method includes identifying a voice packet requiring fewer than a full allocation of fields and therefore having unused fields and multiplexing additional information within one or more fields of the voice packet. Optionally, the ISSI-based protocol may be implemented between two push-to-talk servers, a push-to-talk server and an end-user device, or two end-user devices. Also, the transport network may comprise a wireless network such as an LTE network.

Further, a new message within a packet may be decomposed into a plurality of segments. Each segment may contain a control field which includes the following information: a parameter that indicates a message type and one or more indicators that facilitate re-assembling the segments back to the original message. The indicators may indicate whether the segment is a first segment of a message, a last segment of a message, a middle of a message, or only in a message. The segments may be appended to voice frames in a voice block of the ISSI-based protocol. The voice block may comprise an IMBE or an AMBE voice block.

In yet another embodiment, a non-transitory computer-usable data carrier storing instructions that, when executed by a computer, cause the computer to perform a method of enhancing voice packets using an ISSI-based protocol in a transport network is provided. The method includes: identifying a voice packet requiring fewer than a full allocation of fields and therefore having unused fields and multiplexing additional information within one or more fields of the voice packet.

BRIEF DESCRIPTION OF THE DRAWINGS

The present exemplary embodiments exist in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
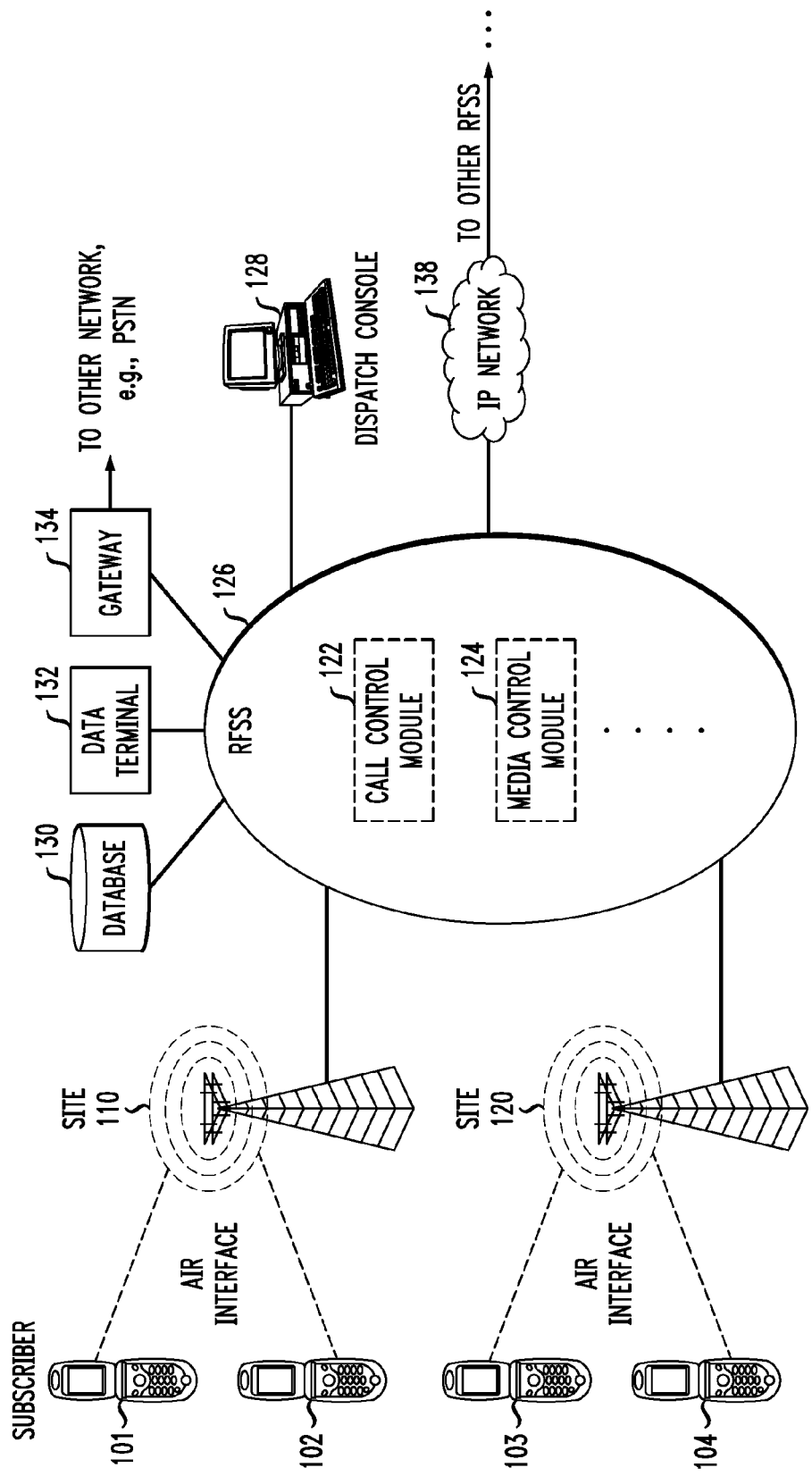
FIG. 1 is an illustration of a system architecture for a P25 network.
Figure 2:
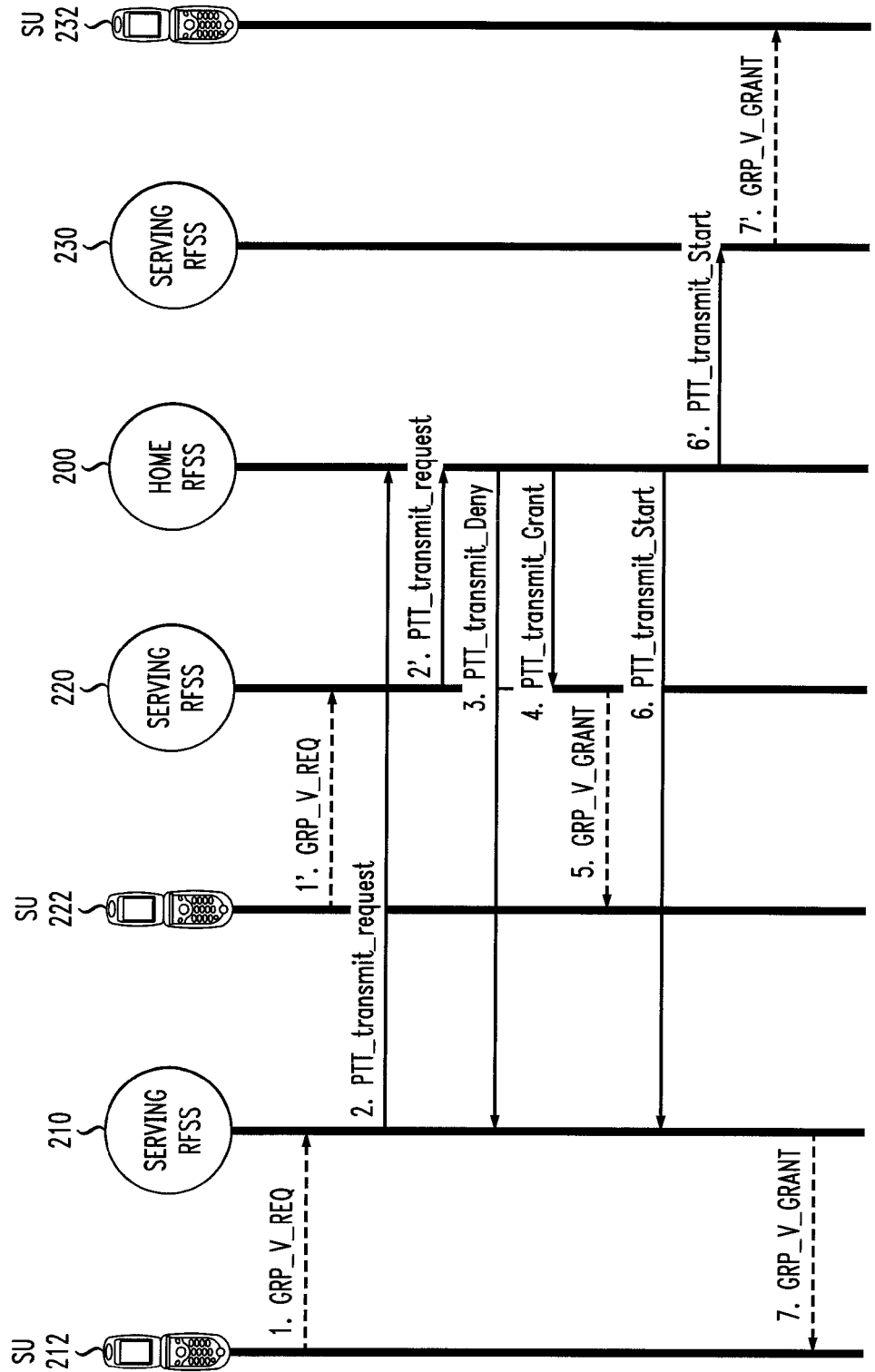
FIG. 2 is an example of the call flow for floor requests for push to talk over ISSI.
Figure 3:
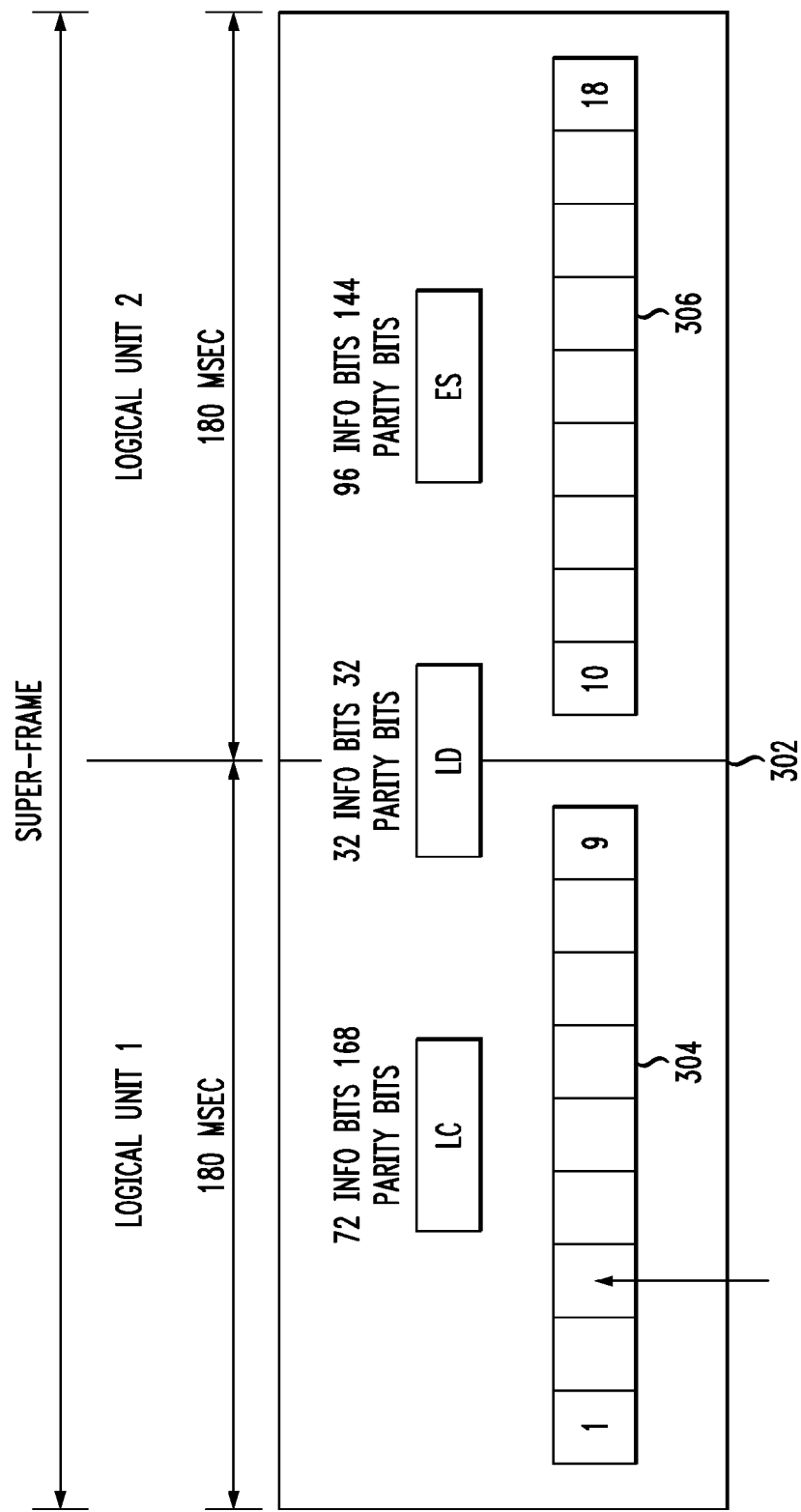
FIG. 3 is an illustration of the structure of an IMBE super frame.
Figure 4:
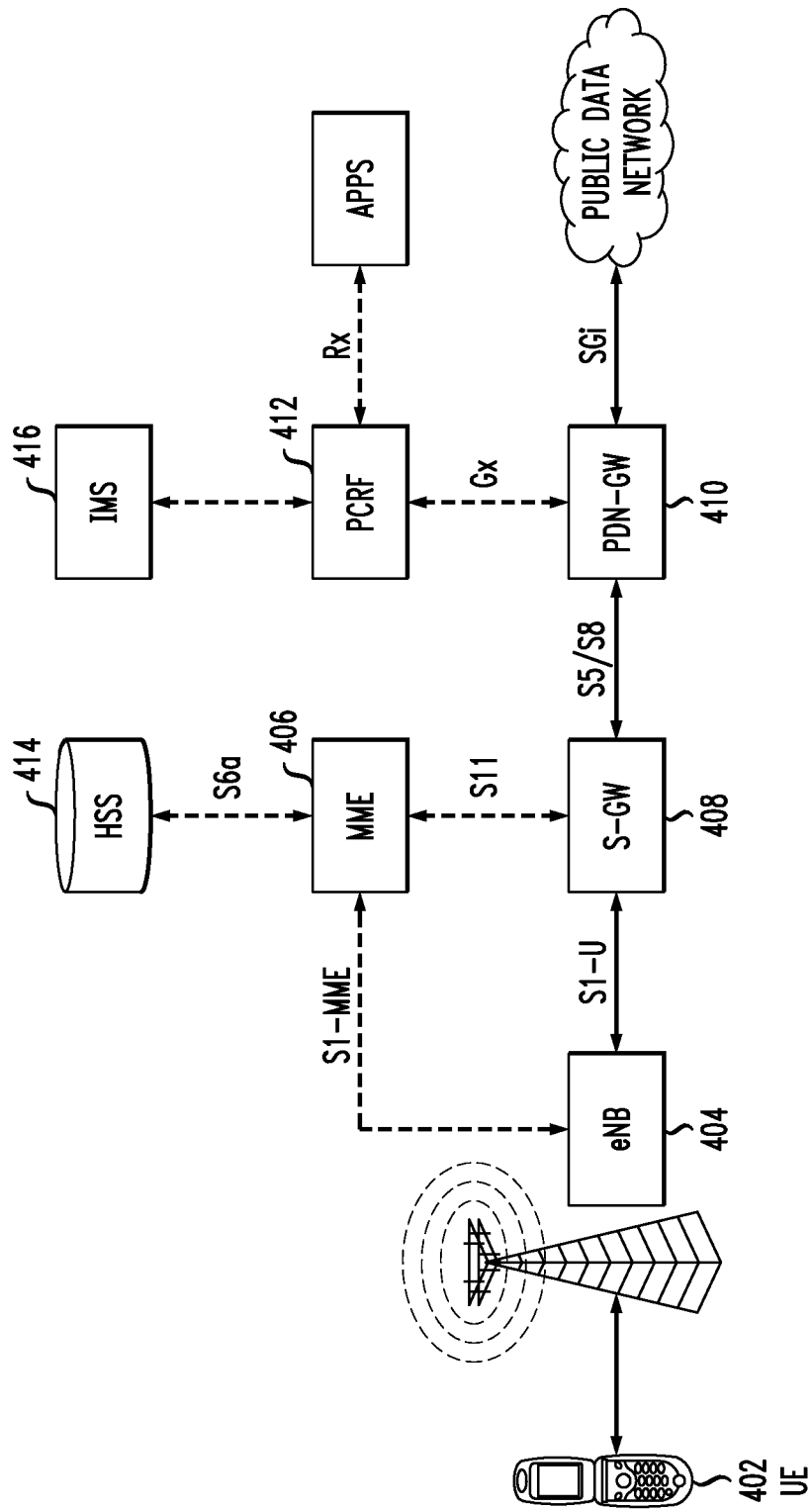
FIG. 4 is an illustration of an exemplary architecture for an LTE network.
Figure 5:
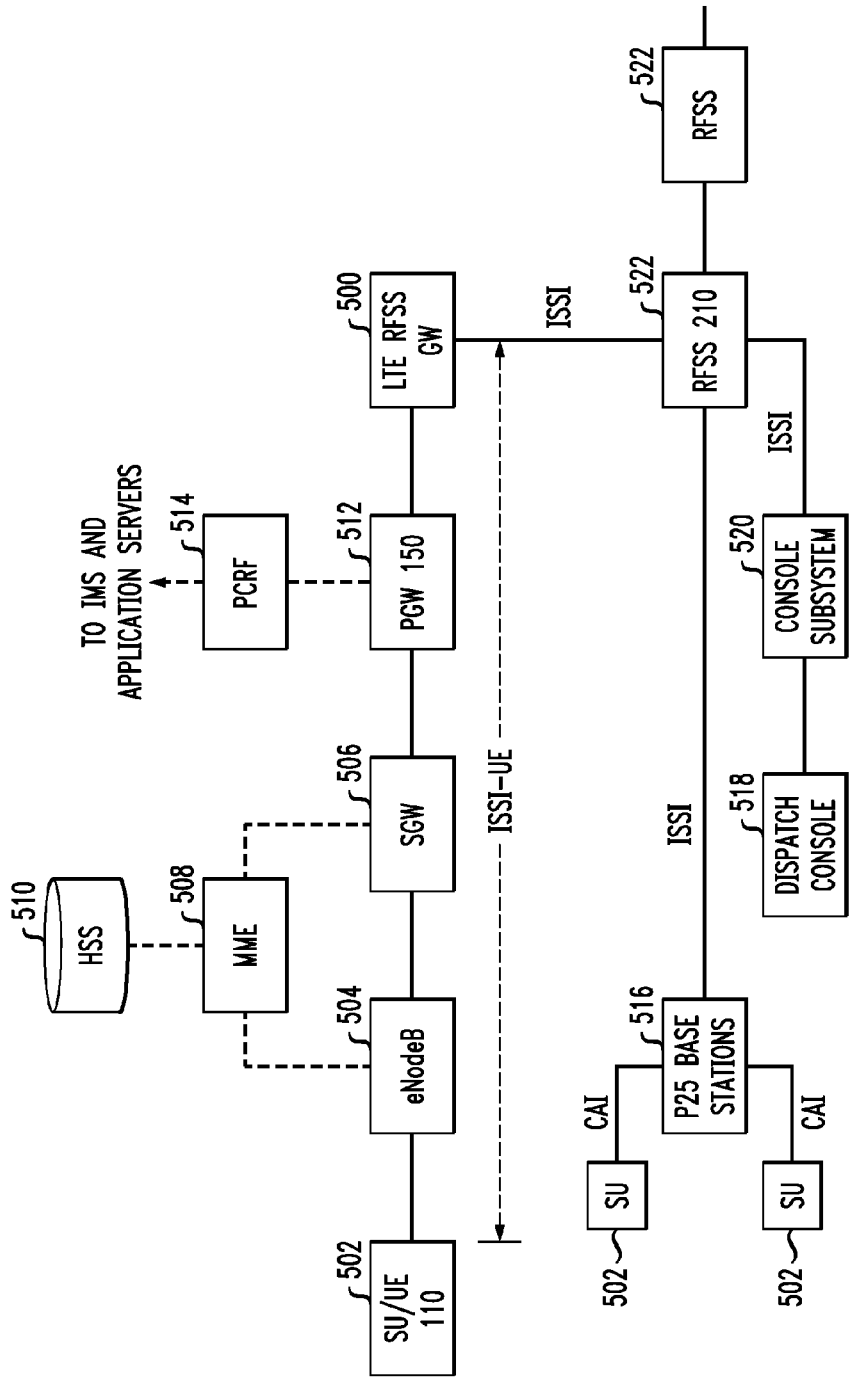
FIG. 5 is illustration of an exemplary architecture for implementing ISSI over P25.
Figure 6:
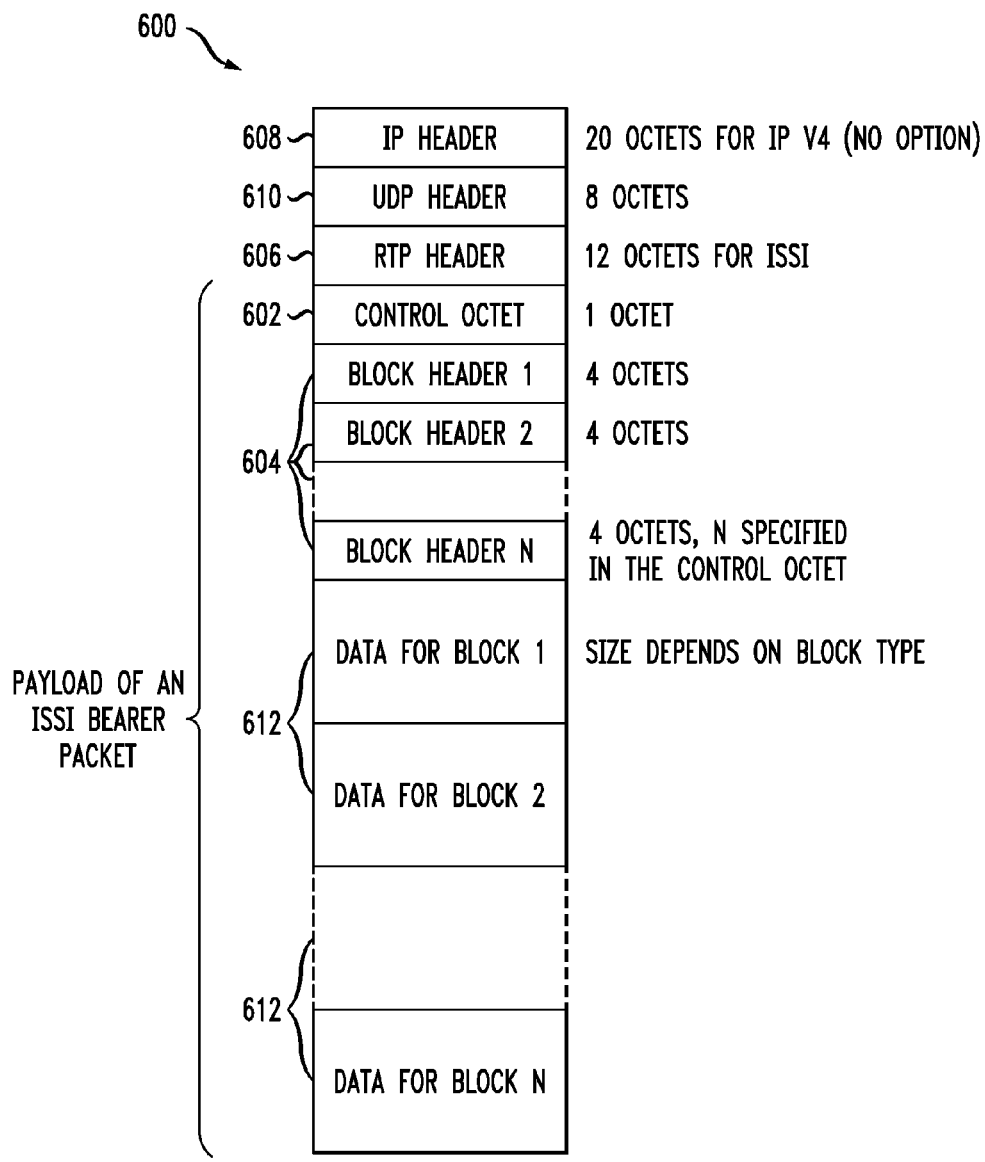
FIG. 6 is an illustration of an exemplary ISSI bearer packet.

Voice bearer packets in ISSI are encapsulated inside an RTP/UDP/IP packet. The structure of an exemplary ISSI bearer packet 600 is illustrated in FIG. 6. The ISSI bearer packet 600 contains one or more blocks. Each bearer packet starts with a control octet 602, which indicates the number of blocks that are contained in the packet 600. Following the control octets are the block headers 604. Each block header is typically 4 octets long and contains at least the following information: block type, length of payload for the block, and timestamp offset (from the time stamp in the RTP header 606). (It is noted that other headers in the packet 600 include an IP header 608 and a UDP header 610.)

The following types of blocks 612 may be included in the packet: IMBE voice, PTT Packet type, ISSI header word, PTT control word, console PTT control word, and/or other manufacturer specific blocks.

The IMBE voice block contains one IMBE voice frame. The first octet of the payload contains information that indicates the position of the voice frame within a super-frame (1 to 18). Some of the voice frame blocks (for frame 1 to 8, frame 10 and frame 11) only contains data from the voice frame and are 14 octets long each. Blocks associated frame 9 and frame 18 has 3 additional octets append to the voice frame resulting in a block length of 17 octets. The additional octets contain the LD field and supporting information. Blocks associated with frames 12 to 17 have 4 additional octets appended to the voice frame, resulting in a block length of 18 octets. The additional octets contain the ES word of a super frame and supporting information. Thus, the size of the IMBE voice block varies from 14 to 18 octets.

The PTT Packet type block is 4 octets long and contains fields such as packet type, which is encoded with the message type of transmission control protocol (such as PTT request, PTT grant, PTT start, PTT deny, and mute, etc.), mute indication, service option, which indicates the services that are requested/required for this call: encryption, packet or circuit mode support, priority, etc., transmission control number, which is used to distinguish the different transmission between the two RFSS, losing audio indication, size of the heartbeat interval.

The ISSI header word block is 14 octets long and contains information such as the message indication, algorithm ID, key ID, talk group ID as encoded in the message header of the CAI interface specification as described previously, the network identifier, the super frame counter which is incremented by one for every super-frame, and/or the number of IMBE voice frames that are contained in a RTP packet for this session. The number of voice frames in an RTP packet could be from 1-3, but it must be constant during a session.

The PTT control word block is 8 octets long and contains the identity of the sender as well as the transmission priority of the session. This applies only when the sender of the traffic is a regular SU.

The console PTT control word block is 24 octets long. This applies only when the sender of the traffic is a console of a dispatcher (and thus has more capability resulting in more fields).

With regard to manufacturer specific blocks, it is to be understood that ISSI allocates a number of code points so that manufacturer may use for their own use. The first octet of the payload block contains the manufacturer ID. The second octet is used to indicate the length of the rest of the payload.

Scheduling Uplink Air Traffic for ISSI Over LTE

When an LTE UE joins a talk group using ISSI-UE, the UE first establishes an EPS bearer for to support the SIP signaling traffic. It then establishes another EPS bearer to support the voice traffic. To ensure good performance, the bearer should generally be a guaranteed bit rate (GBR) bearer with low delay (e.g., the quality of service class indicator, QCI, is encoded with a value of 1). To minimize signaling messages, persistent or semi-persistent scheduling would used. For minimum delay, the UE would send a voice packet for each individual IMBE voice frame (i.e., every 20 milliseconds). Thus, the eNodeB would schedule the uplink so that the UE 502 can transmit every 20 milliseconds. The amount of resources allocated at each time-slot should generally support the largest ISSI-UE packet that could be sent. This amount depends on the transmission strategy in sending the first voice packet.

In ISSI, each talk spurt begins with the ISSI header block. At least two transmission strategies in transmitting this header are possible: (1) the ISSI header is transmitted by itself without any accompanying IBME voice frames, and/or (2) the ISSI header is transmitted with the first IMBR voice frame.

In the first case, the ISSI payload typically consists of the following blocks: the control octet (e.g., 1 octet); the PTT packet type block (e.g., 4 octets long block header plus 4 octet long payload); the PTT control word block (e.g., 4 octets long block header plus 8 octet long payload; the ISSI header block (e.g., 4 octets long block header plus 14 octet long payload). Thus, the size of this payload packet would be (1+8+12+18) =39 octets long. The entire IP packet would be (39+40)=79 octets long. The additional 40 octets accounts for the size of the IP, UDP, and RTP headers.

Subsequent packets would typically contain a single IMBE frame and include the following blocks: the control octet (e.g., 1 octet); the PTT packet type block (e.g., 4 octets long block header plus 4 octet long payload); the PTT control word block (e.g., 4 octets long block header plus 8 octet long payload); the IMBE voice block (e.g., 4 octets long block header with a payload that could be 14, 17, or 18 octets long depending whether it has LD or ES data appending to the IMBE frame). The packet size, including the IP/UDP/RTP headers would then be 79, 82, or 83 octets. Thus, the maximum packet size would be 83 octets. Therefore, the eNodeB should generally reserved resources so that at least 83 octets can be transmitted every milliseconds. This equals to a bandwidth allocation of 83*8*50=33.2 Kbps for the voice bearer.

In the scenario where the ISSI header and the first IMBE frame are transmitted together, the packet size for this packet would be 97 octets, as the additional IMBE data block adds extra 18 octets (4 octet long header plus 14 octets of IMBE frame) to a packet that only contains the header. This is the largest packet. The resulting bandwidth would be 97*8*50, which equals 38.8 bps.

In the first scenario, the allocation is 83 octets per time slot. However, about half of the frames (10 out of 18) are transmitted at 79 octets. Therefore, 4 octets are wasted for those packets. In the second scenario, there 14-18 octets per time slot after the first packet are wasted. The exemplary embodiments specify means for using these unused resources by multiplexing other important information with the voice packets.

In ISSI, an IMBE frame is encoded in the IBME voice block. The first octet of the IMBE voice block is the frame type field, which indicates the position of the IMBE frame within a super-frame. The frame type field is encoded, as specified in the ISSI standard, as shown in Table 1:

TABLE 1

| Position | Value | Data content |
|---|---|---|
| 1 | xC2 | IMBE data only |
| 2 | xC3 | IMBE data only |
| 3 | xC4 | IMBE data only |
| 4 | xC5 | IMBE data only |
| 5 | xC6 | IMBE data only |
| 6 | xC7 | IMBE data only |
| 7 | xC8 | IMBE data only |
| 8 | xC9 | IMBE data only |
| 9 | x6A | with LD |
| 10 | xCB | IMBE data only |
| 11 | xCC | IMBE data only |
| 12 | x6D | With ES |
| 13 | x6E | With ES |
| 14 | x6F | With ES |
| 15 | x70 | With ES |
| 16 | x71 | With ES |
| 17 | x72 | With ES |
| 18 | x73 | With LD |

In Table 1 above, the symbol "x" designates hexadecimal digits. Therefore, 6A indicates the bit string "01101100".

In one scenario the ISSI header is sent as a stand-alone packet separate from the first IMBE frame. In that case IMBE frames 1 to 8, 10, and 11 in a super frame are encoded without LD or ES fields appended to it. Frames 9 and 18 would have 3 extra octets appended to the IMBE frame to convey the LD field. And frames 12-17 would have 4 octets appended to the IMBE frame to convey the ES field.

When PS or SPS is used, the eNobeB will generally allocate sufficient resources for an UE to transmit the largest packet. Those would be the packets with the ES field attached. For frames without the LD or ES field appended to it, other applications can append 4 other octets (as dictated by the application) to it without increasing the resource allocation by the eNodeB. An exemplary method for encoding these four octets to support various applications is described below.

For simplicity, reference is made to (1) an IMBE data block that contains an IMBE frame only as a basic IMBE block; (2) an IMBE data block with LD appended as a LD-IMBE block; (3) an IMBE data block with ES appended as an ES-IMBE block; and (4) an IMBE data block with other data appended (up to 4 octets) as an enhanced IMBE block To distinguish an enhanced-IMBE block from a basic-IMBE block, a new set of frame type values is assigned to the IMBE block. One embodiment of the assignment is as follows. Note that the first hexadecimal digit of the frame type of a basic-IMBE block is the digit "C". Now replace the digit "C" with digit "D". The first hexadecimal digit for the LD-IMBE block and the ES-IMBE block are either "6" or "7".

Therefore, this assignment will generally distinguish an enhanced IMBE block from all other IMBE block types. Note that the second hexadecimal digit will remain the same as the corresponding basic IMBE block, and it can be used to determine the position of the IMBE frame within the super-frame.

Figure 7:
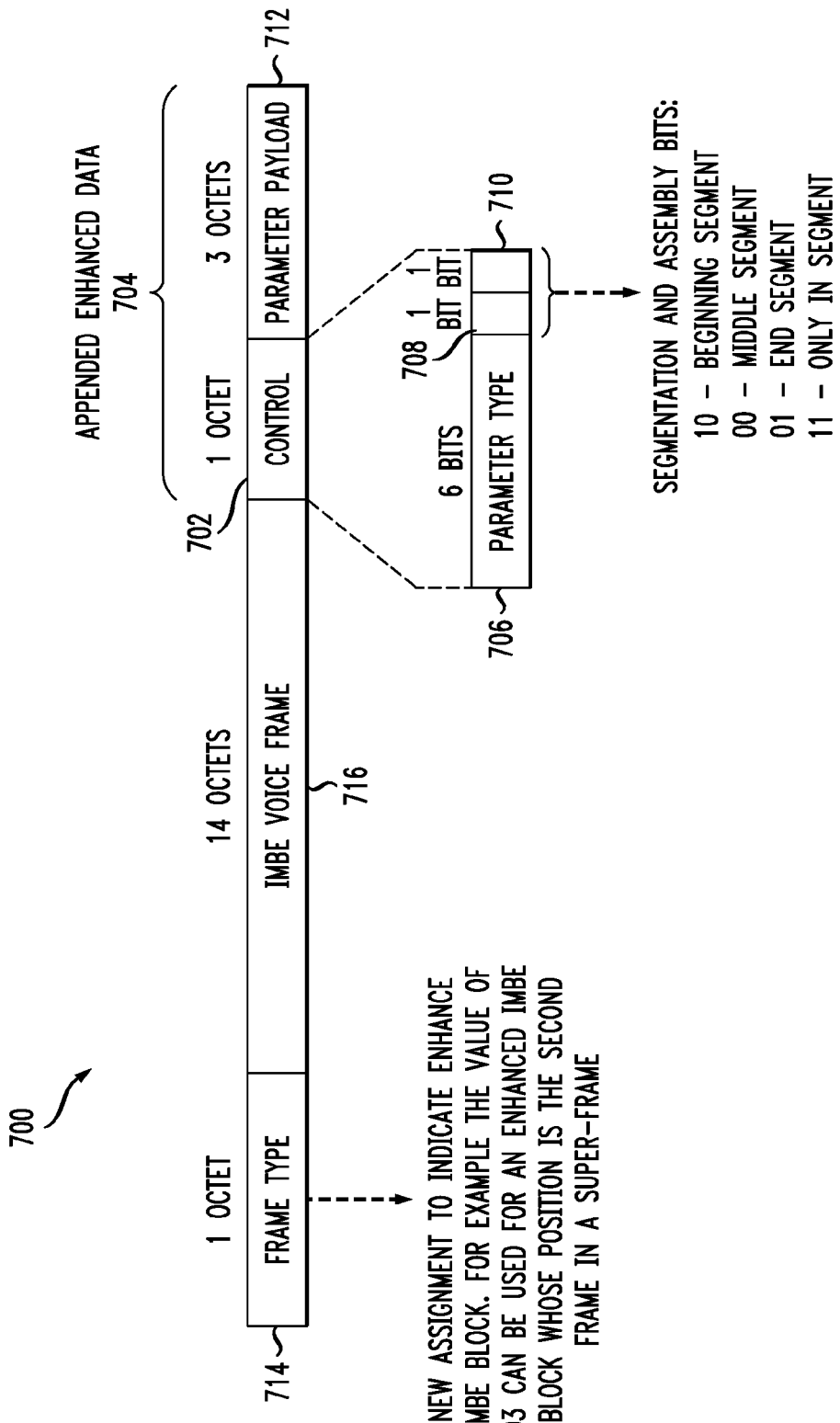
FIG. 7 is an illustration of the format of an enhanced IMBE block.

Some applications may want to transfer data containing more than 4 octets. Therefore, it would be helpful to provide a facility so that application data can be conveyed over multiple enhanced-IMBE blocks. One embodiment of an enhanced IMBE block 700 is encoded as illustrated in FIG. 7. The first octet 702 of the appended octets 704 is a control octet. The first 6 bits 706 are used in indicate the parameter type (e.g., longitude information). Bit 7 (708) is set to 1 is if the appended data is the first data segment of a parameter. It is set to 0 otherwise. Bit 8 (710) is set to 1 if the appended data is the last segment of a parameter. It is set to 0 otherwise. The next 3 octets 712 may comprise the parameter payload. The value of the frame-type parameter 714 can serve as a sequence number and can be used to detect missing IMBE blocks due to errors in transmission. The enhanced IMBE block 700 also contains an IMBE voice frame 716 comprising 14 octets.

Figure 8:
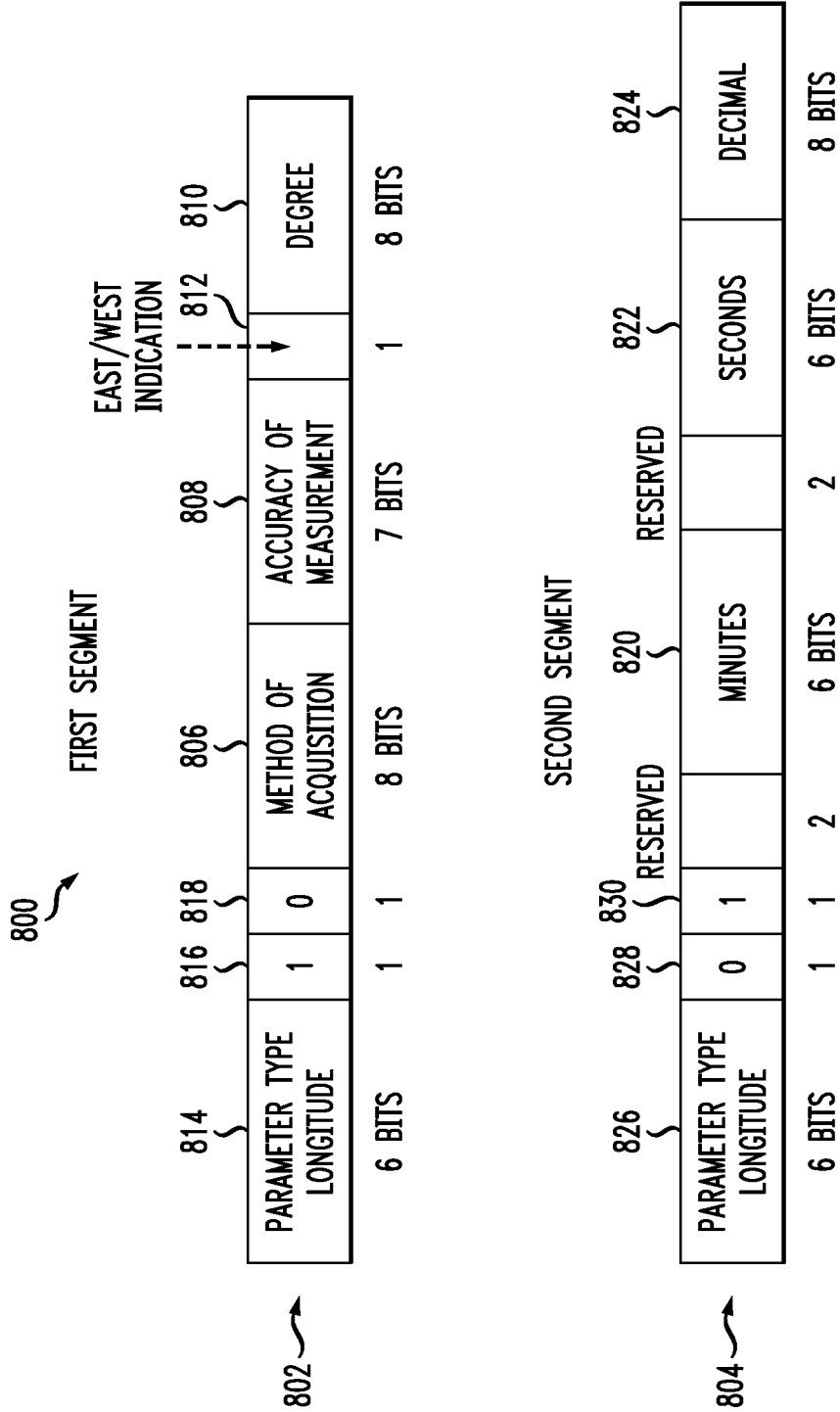
FIG. 8 is an example of the encoding of the longitude parameter.

One application that is well suited to this exemplary embodiment is the reporting of the geographic location of the UE. An example of this type of encoding for the longitude parameter is illustrated in FIG. 8. Geographic location can be encoded with two parameters, i.e., (1) longitude of the location and (2) latitude of the location. Longitude usually is encoded as degrees-minutes-seconds-decimals of a degree plus an indication as to whether it is east or west of the prime meridian. In one embodiment, the longitude parameter 800 would be encoded in two segments (802 and 804). The three octets of the first segment 802 would be encoded to indicate: the method that the geographic information is acquired (e.g., via GPS, triangulation of the cell towers, etc) 806; the accuracy of such a measurement (e.g., to the nearest seconds, to the first decimal, to the second place decimal, etc.) 808; the degrees (from 0 to 180) 810; and an indicator to indicator whether the location is east or west of the prime meridian 812. Other octets would include an indication that the parameter type is longitude 814. The two bits after the parameter fields are the segmentation bit 816 and the assembly bit 818. They are encoded as (1, 0) to indicate that this is the first segment of the message.

The second segment 804 will generally typically carry the following information: the measurement in minutes 820, in seconds 822, and in tenths of a second 824. Other octets would include an indication that the parameter type is longitude 826. The two bits after the parameter fields are the segmentation bit 828 and the assembly bit 830. They are encoded as (0, 1) to indicate that this is the last segment of the message.

The latitude of the location can be encoded similarly. Instead of the east/west indication, the indication is for north/south of the equator.

Another parameter related to geographic location is the height. Measurement of height is usually expressed as xxxx.yy units. In one embodiment, this parameter is encoded in two segments, which contain at least the following information: an identifier that indicates the reference point (the default would be ground level), an indication whether the measurement is above or below the reference point, the unit of measurement (e.g., meter, feet, kilo-meter, etc.), the accuracy of the measurement (e.g., to the nearest feet), the value of xxxx, and/or the value of yy. Other useful parameters that could be sent this way are network location of the UE include Cell ID and tracking area ID.

In many instances, public safety worker carry a number of sensors. Measurement from sensors can also be sent from the UE using this exemplary embodiment. Examples of such sensor measurements are: temperature of the environment (useful in fighting forest fires) and heartbeat and temperature of the public safety worker (useful for health monitoring).

With a 6-bit field for parameter type, a total of 64 parameters can be supported. However, assigning new frame types (e.g., using additional hexadecimal digit "E", "F", etc. as the first digit for frame type instead of "C", much more parameters can be supported).

With this exemplary embodiment, the UE can send a small amount important data together with the voice traffic to the ISSI/LTE server without increasing the resource allocation of the EPS bearer. The ISSI/LTE can forward this information to other UE that are members of the talk group, special endpoints such as dispatch stations and recording devices that has express their interest in receiving such data, other ISSI/LTE servers, a P25 RFSS that supports this feature.

Figure 9:
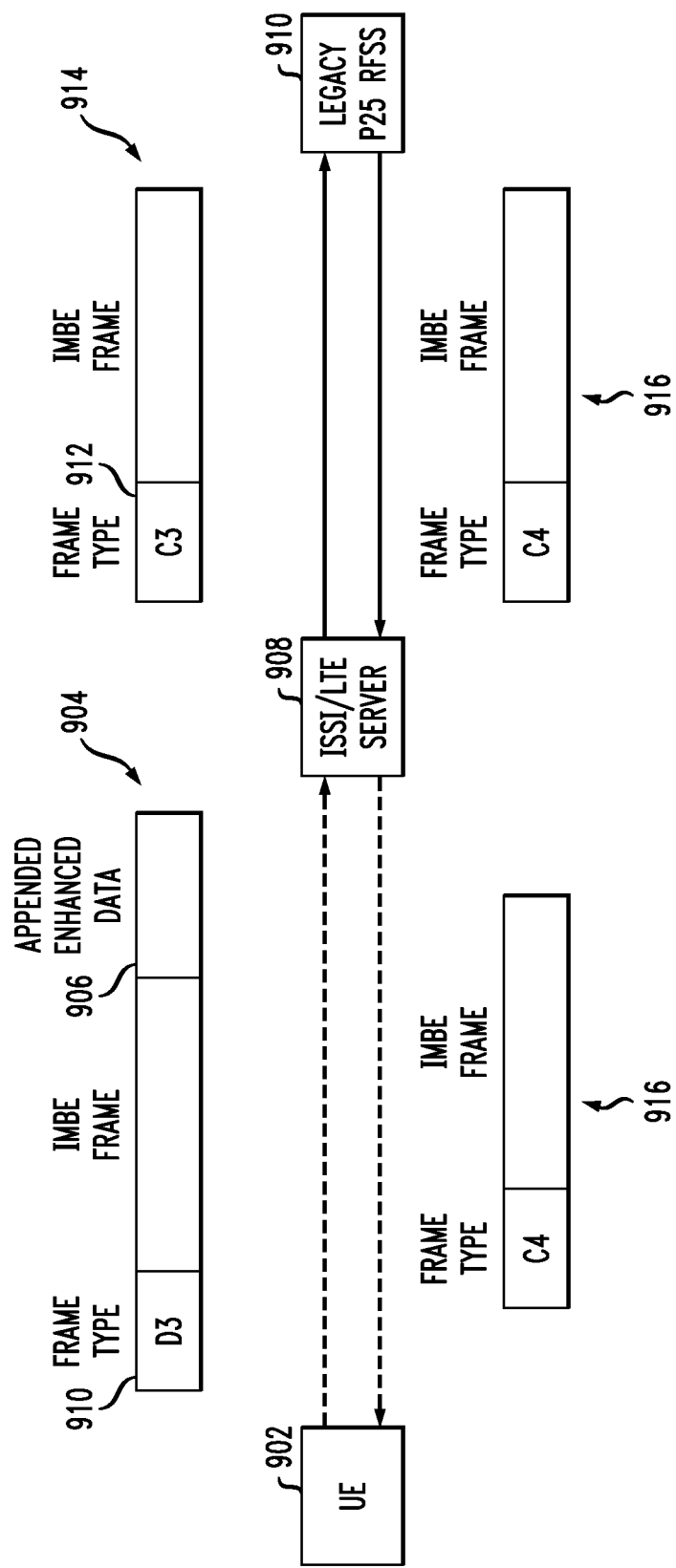
FIG. 9 illustrates how enhanced IMBE blocks are converted to basic IMBE blocks when forwarding packets to a legacy P25 RFSS.

When forwarding voice traffic to a legacy P25 RFSS that does not support this new feature (i.e., an enhanced IMBE block), the ISSI/LTE server would be required to remove any appended enhanced data from the IMBE voice block and convert the value of the frame type in the IMBE block to the corresponding value for the basic-IMBE block. This is to say that the ISSI/LTE server will generally convert an enhanced IMBE block to the corresponding basic IMBE block. This process is illustrated in FIG. 9. It should be noted that only IBME blocks are shown in the figure. The ISSI block packet contains other blocks. In FIG. 9, when the UE 902 sends an RTP packet 904 with an enhanced IMBE block 906 to the ISSI/LTE server 908, the frame type parameter 910 of the IMBE voice block 904 is encoded with a value of D3, indicating that this is an enhanced IMBE block. When the ISSI/LTE server 908 receives this packet 904, it may forward this packet to a legacy P25 RFSS 910. In this case, the ISSI/LTE server 908 will first remove the appended enhanced data 906 from the IMBE block 904. The server 908 then translates the frame type parameter value 912 from D3 to C3. The ISSI/TLE server 908 then forwards the modified packet 914 to the legacy RFSS 910 after these two actions. When the RFSS 910 returns an RTP packet 916 to the ISSI/LTE server 908, the server 908 would forward the packet 916 to the UE 902 without change, as indicated in the figure.

Now, let us consider the scenario where the first voice packet contains both the header block and the 1st IMBE frame of talk spurt. This scenario has the advantage of less delay. However, this first packet would be the largest packet. Subsequent ISSI packets in the same talk spurt will generally not contain the ISSI header block and would be 14 to 18 octets shorter, depending on whether the IMBE block is a basic block, a LD-block or an ES-block. Therefore, one can take advantage of this and send enhanced data in the packet if so desired. Because the available resource (14-18 octets) is much larger, a more efficient method may be to send the enhanced data as a separate block.

Figure 10:
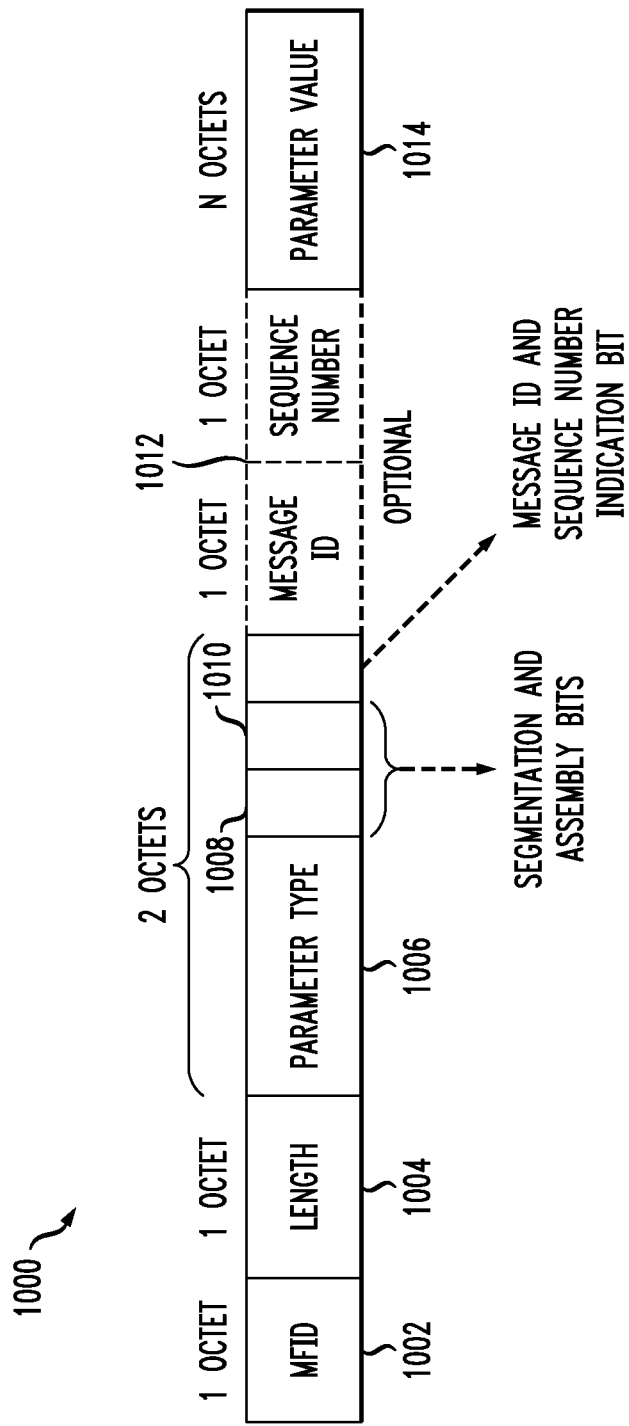
FIG. 10 is an example of a new block type that is designed to carry short parameters-based data.

ISSI reserves block type values from 63 to 127 to represent manufacturer specific block. One of these values can be used to designate short data parameter block, say value 100. One embodiment for the structure of a short parameter block 1000 is illustrated in FIG. 10. This embodiment is generally referred to as an enhanced-parameter-block. The block contains fields such as Manufacturer ID (e.g., 1 octet) field 1002, a length of subsequent payload (e.g., 1 octet) field 1004, and a control (or parameter type) field 1006 (e.g., 2 octets). Functionally it is the same as the control octet as described previously, except that it is 2 octets long. The extra bits allows for the support of more parameters. The segmentation and the assembly bits (1008, 1010) are still included to accommodate parameters that are long in length. In addition, a message-ID bit and sequence-number indicator bit 1012 may be added. If the bit 1012 is set to 1, the 2 octets following the control octets will generally be encoded as follows: the octet that immediately follows the bit will generally be the message ID and the next octet contains a sequence number of the segments of a message. The first segment of a message is encoded with the value "1". The usage of these two octets is optional dictated by the application. The intended use is to aid in error detection and recovery. In addition, the block may include a parameter value field 1014. The encoding of this field depends on the parameter.

For simplicity, the above embodiments support a single parameter per block. Multiple enhanced-parameter-blocks can be included in the same ISSI message for the conveyance of multiple parameters. The exemplary embodiment can be easily extended to allow multiple parameters to be conveyed in the same enhanced-parameter-block.

With the introduction of this new block type, it is possible for the UE to send ISSI packet to the ISSI/LTE server without accompanied IMBE blocks. These packets would contain blocks such as packet type (must be encoded as PTT-request or PTT-progress), control word, and/or one or more enhanced-parameter-blocks. In particular, these packets can be sent to the ISSI/LTE GW even if the UE does not win the floor or sending any voice frames. For prolonged sessions, it is possible for the UE to set up a separate dedicated EPS bearer to the ISSI/LTE server or other interested parties.

P25 supports two vocoders over the air, the IMBE and the AMBE (Advanced Multi-Band Excitation). The AMBE is a lower rate vocoder, allowing two voice calls to be supported over a single P25 channel. When the ISSI was first developed, the AMBE was still under development. Therefore, the first version of the ISSI only supports the IMBE. Currently, TIA covers development specifications for AMBE over the ISSI. It is envisioned that, apart from being smaller in size, the encoding of AMBE frames over the ISSI will follow the same structure as the IMBE. In this case, this invention would still apply for the AMBE vocoder.

In this regard, an exemplary computer-implemented method of transmitting supplemental information in IMBE blocks may include identifying an IMBE voice block requiring fewer than a full allocation of octets and therefore having unused octets, revising a frame type identifier associated with the identified block to identify the block as an enhanced IMBE block, selecting some of the unused octets to act as a control field, assigning values to some of the control field to identify a parameter type, and assigning values to some of the control field to indicate that appended data is one of: the first data segment of the parameter, the last data segment of the parameter, or an intermediate data segment of the parameter. The method would further include assigning values to other octets of the unused octets according to the parameter value and metadata describing aspects of the parameter value, thereby completing the assembly of an enhanced IMBE block, and then transmitting the enhanced IMBE block.

In another embodiment, a computer-implemented method of enhancing voice packets using an ISSI-based protocol in a transport network includes identifying a voice packet requiring fewer than a full allocation of fields and therefore having unused fields and multiplexing additional information within one or more fields of the voice packet.

The exemplary embodiments may be implemented as a software module at the UE, the ISSI/LTE servers, special end-points such as dispatch station and recording device, as well as RFSS that would like to support enhanced functions. There are many variations to the embodiment as specified above. It is appreciated that these variations although not explicitly described or shown herein, embody the principles of the exemplary embodiment, and are included within its spirit and scope.

It is to be understood that the functions of the various elements shown in the figures, including any functional blocks labeled as "modules," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should generally not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A person of skill in the art would readily recognize that steps of various above-described methods can be performed by programmed computers. Herein, some embodiments are also intended to cover program storage devices, for example, digital data storage media, which are machine or computer readable and include encoded machine-executable or computer-executable programs of instructions, wherein said instructions perform some or all of the steps of said above-described methods. The program storage devices may be, for example, digital memories, magnetic storage media such as a magnetic disks and magnetic tapes, hard drives, or optically readable digital data storage media. The embodiments are also intended to cover computers programmed to perform said steps of the above-described methods.

The exemplary embodiment has been described with reference to the preferred embodiments. Obviously, modifications and alterations will generally occur to others upon reading and understanding the preceding detailed description. It is intended that the exemplary embodiment be construed as including all such modifications and alterations insofar as they come within the scope of the appended claims or the equivalents thereof.

We claim:

1. A computer-implemented method of transmitting supplemental information in Improved Multi-Band Excitation (IMBE) voice blocks in a transport network, the method comprising:

identifying an IMBE voice block with unused octets;

revising a frame type identifier associated with the identified IMBE voice block to identify the IMBE voice block as an enhanced IMBE voice block by replacing a first hexadecimal digit of a frame type of the identified IMBE voice block with a second hexadecimal digit that is different from the first hexadecimal digit;

selecting at least one of the unused octets to act as a control field;

assigning values to a first number of bits in the control field to identify a parameter type;

assigning values to a second number of bits in the control field to indicate that appended data is one of: the first data segment of the parameter, the last data segment of the parameter, or an intermediate data segment of the parameter;

assigning values to other octets of the unused octets according to the parameter value and metadata describing aspects of the parameter value, thereby completing the assembly of an enhanced IMBE voice block; and transmitting the enhanced IMBE voice block.

2. The method of claim 1, wherein the transport network comprises a wireless network.

3. The method of claim 2, wherein the wireless network comprises an LTE network.

4. A computer-implemented method of enhancing voice packets using an ISSI-based protocol in a transport network, the method comprising:

identifying a voice packet requiring fewer than a full allocation of fields and therefore having unused fields;

revising a frame type identifier associated with the identified Improved Multi-Band Excitation (IMBE) voice block to identify the IMBE voice block as an enhanced IMBE voice block by replacing a first hexadecimal digit of a frame type of the identified IMBE voice block with a second hexadecimal digit; and multiplexing additional information within one or more fields of the enhanced voice packet, wherein a new message within a packet is decomposed into a plurality of segments and one or more segments contain a control field which includes a parameter that indicates a message type and one or more indicators that facilitate re-assembling the segments back to the original message.

5. The method of claim 4, wherein the ISSI-based protocol is implemented between two push-to-talk servers, a push-to-talk server and an end-user device, or two end-user devices.

6. The method of claim 4, wherein the transport network comprises a wireless network.

7. The method of claim 6, wherein the wireless network comprises an LTE network.

8. The method of claim 4, wherein the indicators indicate whether the segment is a first segment of a message, a last segment of a message, a middle of a message, or only in message.

9. The method of claim 4, wherein the segments are appended to voice frames in a voice block of the ISSI-based protocol.

10. The method of claim 9, wherein the voice block comprises an IMBE or AMBE voice block.

11. The method of claim 4 wherein is the segments are encoded as a new type of ISSI block.

12. A non-transitory computer-usable data carrier storing instructions that, when executed by a computer, cause the computer to perform a method of enhancing voice packets using an ISSI-based protocol in a transport network, the method comprising:

identifying a voice packet requiring fewer than a full allocation of fields and therefore having unused fields;

revising a frame type identifier associated with the identified Improved Multi-Band Excitation (IMBE) voice block to identify the voice packet as an enhanced IMBE voice block by replacing a first hexadecimal digit of a frame type of the identified IMBE voice block with a second hexadecimal digit; and multiplexing additional information within one or more fields of the enhanced voice packet, wherein a new message within a packet is decomposed into a plurality of segments and one or more segments contain a control field which includes a parameter that indicates a message type and one or more indicators that facilitate re-assembling the segments back to the original message.

13. The non-transitory computer-usable data carrier of claim 12, wherein the indicators indicate whether the segment is a first segment of a message, a last segment of a message, a middle of a message, or only in message.

14. The non-transitory computer-usable data carrier of claim 13, wherein the segments are appended to voice frames in a voice block of the ISSI-based protocol.

15. The non-transitory computer-usable data carrier of claim 12, wherein the segments are appended to voice frames in a voice block of the ISSI-based protocol.

16. The non-transitory computer-usable data carrier of claim 15, wherein the voice block comprises an Improved Multi-Band Excitation (IMBE) or Advanced Multi-Band Excitation (AMBE) voice block.

17. The non-transitory computer-usable data carrier of claim 12, wherein the segments are encoded as a new type of ISSI block.

* * * * *